United States Patent [19]

Hawthorne et al.

[11] Patent Number: 5,176,396
[45] Date of Patent: Jan. 5, 1993

[54] FIFTH WHEEL UNLOCKING DEVICE WITH FLUID POWERED REDUNDANCY

[75] Inventors: V. Terrey Hawthorne, Lisle; John W. Kaim, Chicago, both of Ill.

[73] Assignee: AMSTED Industries Incorporated, Chicago, Ill.

[21] Appl. No.: 680,121

[22] Filed: Apr. 3, 1991

[51] Int. Cl.⁵ .............................................. B62D 53/10
[52] U.S. Cl. ................................... 280/434; 280/437
[58] Field of Search .............................. 280/432–434, 280/436, 437, 446.1

[56] References Cited

U.S. PATENT DOCUMENTS

| | | |
|---|---|---|
| 2,471,854 | 5/1949 | Bies et al. |
| 2,623,753 | 12/1952 | Madigan ........................ 280/434 |
| 2,861,818 | 11/1958 | Kayler et al. ................... 280/434 |
| 3,002,767 | 10/1961 | Gresko ............................ 280/434 |
| 3,876,239 | 4/1975 | Jackson et al. ................. 280/434 |
| 3,892,426 | 7/1975 | Ferris ............................. 280/434 |
| 4,477,100 | 10/1984 | Elyakim .......................... 280/434 |
| 4,871,182 | 10/1989 | Altherr et al. .................. 280/434 |
| 5,028,067 | 7/1991 | Madura ........................... 280/433 |

Primary Examiner—Joseph E. Valenza
Attorney, Agent, or Firm—Edward J. Brosius; F. S. Gregorczyk

[57] ABSTRACT

An accessory fluid cylinder and cam apparatus mounted under a fifth wheel may be energized by a tractor compressed air system to enable a driver to automatically and remotely unlock the fifth wheel jaw to release a trailer king pin when the tractor parking brake is engaged.

20 Claims, 3 Drawing Sheets

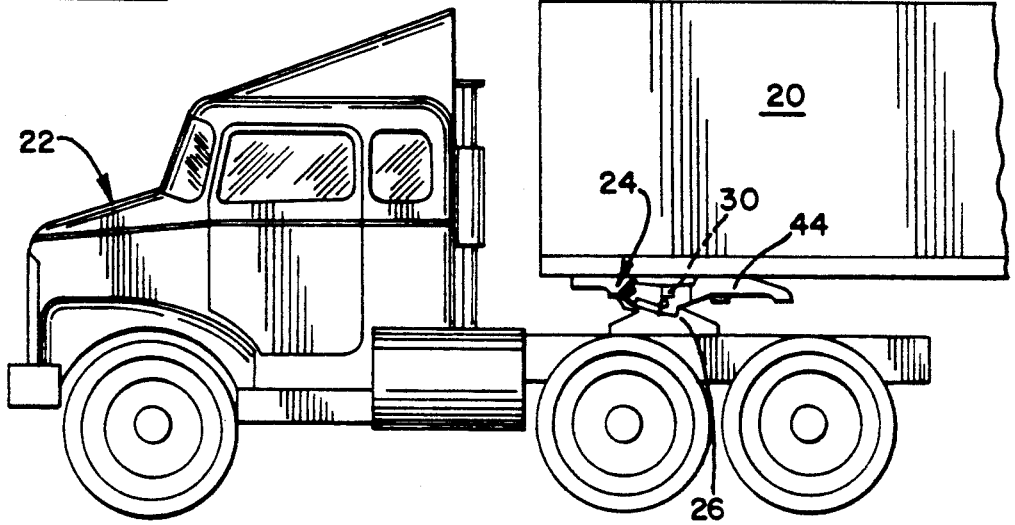
FIG_1.
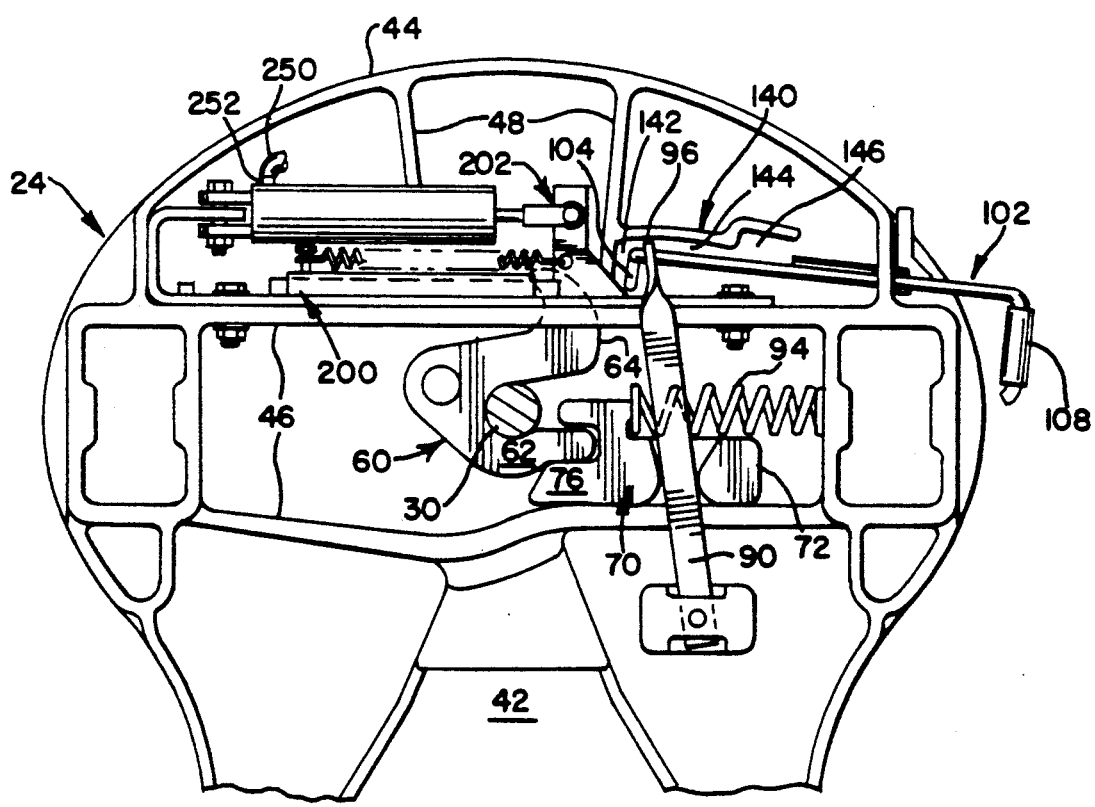
FIG_2.

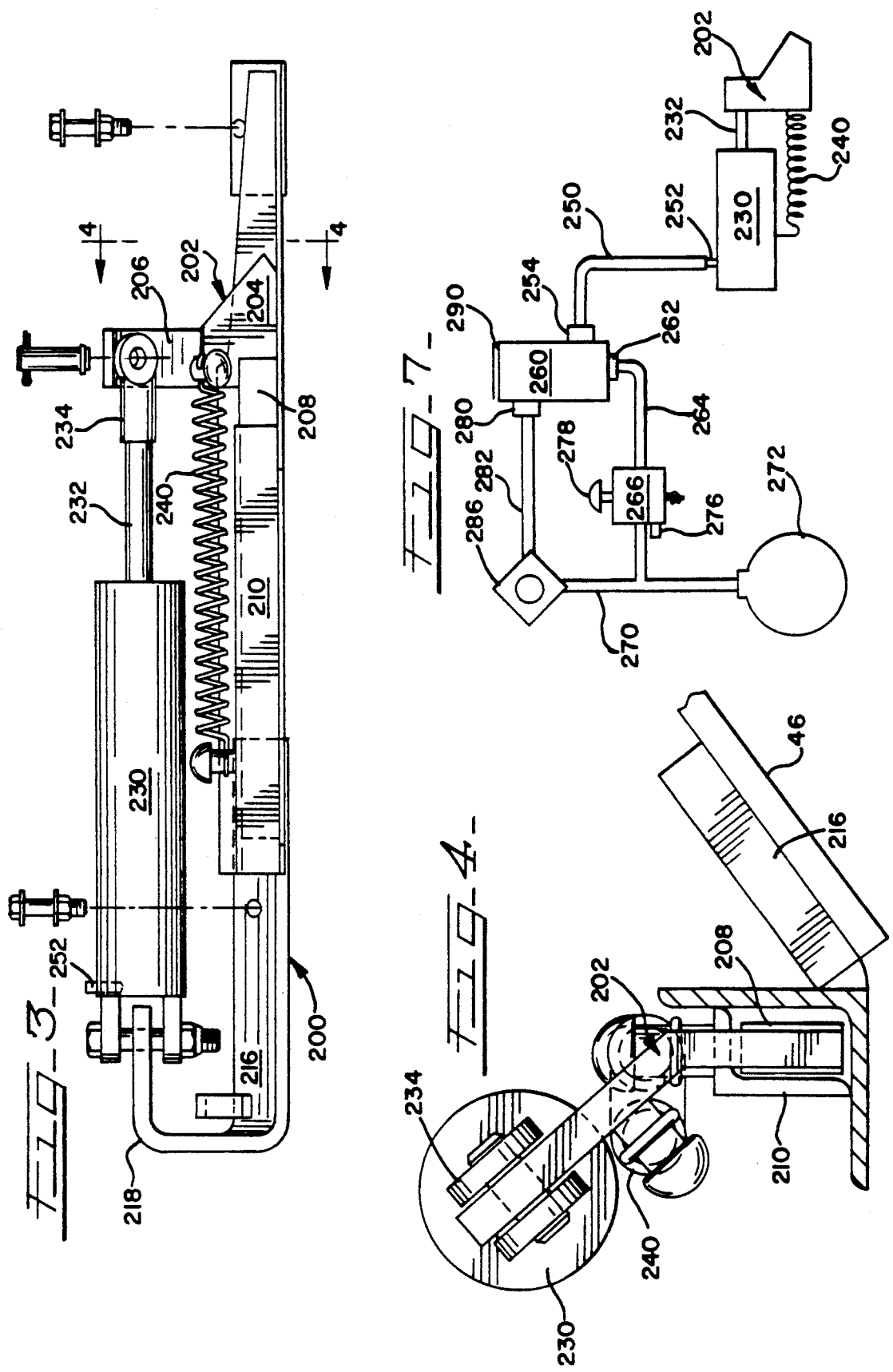

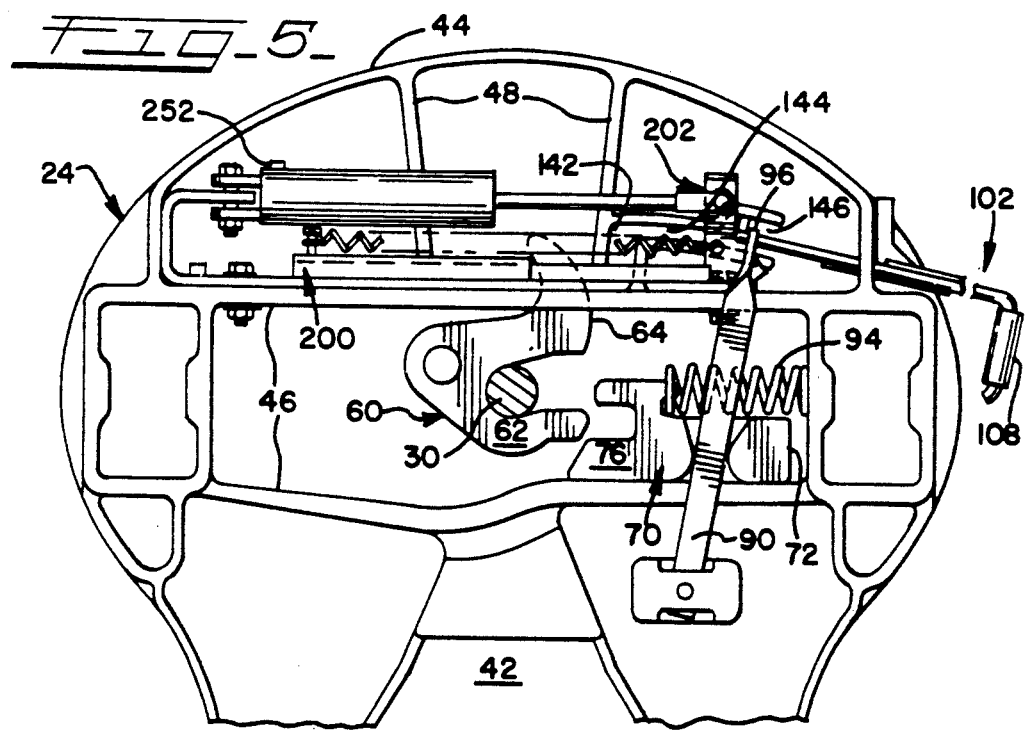
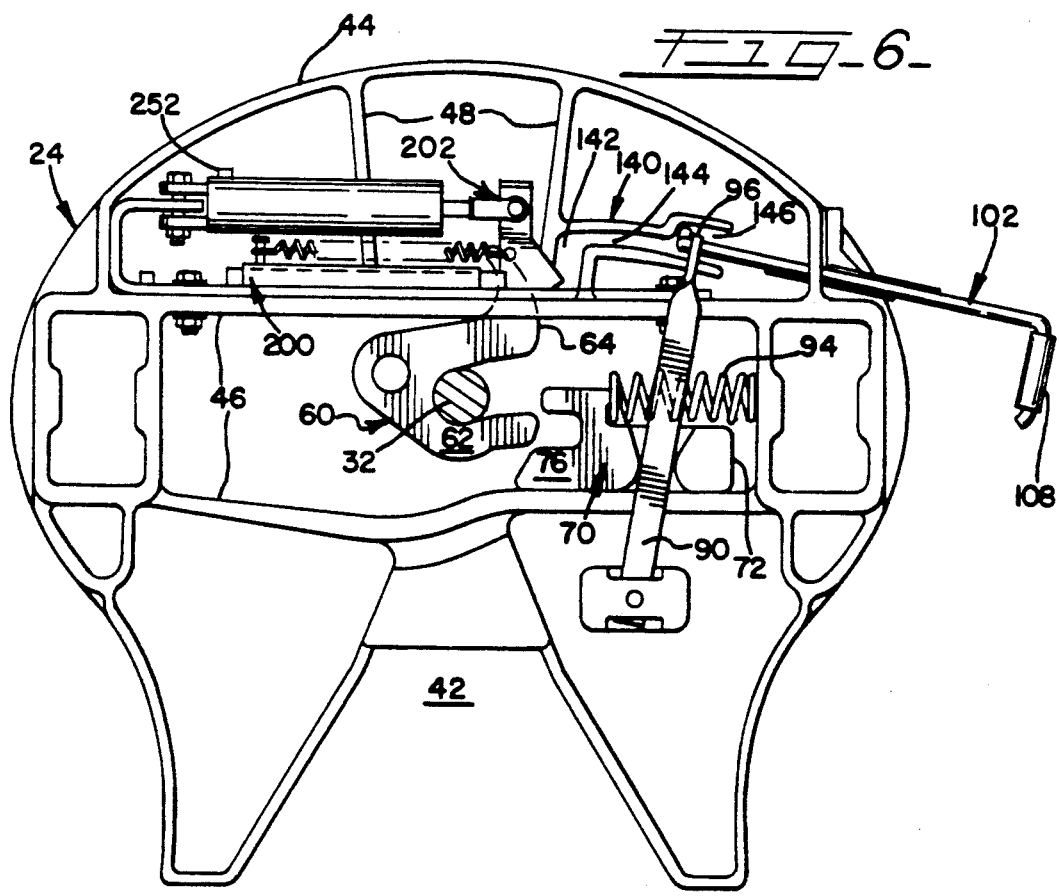

FIFTH WHEEL UNLOCKING DEVICE WITH FLUID POWERED REDUNDANCY

FIELD OF INVENTION

The present invention relates to fifth wheels for over the road tractors and more particularly to an improved redundant powered apparatus for unlocking the connection to a trailer.

BACKGROUND OF THE INVENTION

This invention is an improvement on the apparatus shown in prior U.S. Pat. No. 4,871,182 to Russell G. Altherr et al, the disclosure of which is incorporated herein by reference.

Fifth wheel devices include a plate which supports the forward bed plate of a trailer. A king pin is fixed to the trailer bed plate and extends into a center opening of the fifth wheel plate. Fifth wheels have included a pivotally mounted jaw to engage and hold the king pin against horizontal withdrawal. Normally, the jaw closes and is locked on the king pin as the tractor and trailer are brought together. However, there is also a mechanism provided to unlock the jaw to permit horizontal release of a king pin and allow separation of tractor and trailer when the trailer is stationary and the tractor is powered forward. That mechanism usually is operable manually by a driver and includes safeguards so as to avoid accidental release. While there have been earlier designs for automatically unlatching fifth wheels, for example see U.S. Pat. No. 2,471,854 to Bies et al, experience with over the road hauling during the last several decades has developed an abundance of caution against automatic operation of fifth wheels and, largely for reasons of safety, the industry has disdained powered release mechanisms. Thus modern over the road fifth wheels, such as that shown in U.S. Pat. No. 4,871,182, have incorporated locking features that are solely manually operable from outside the tractor cab and have not been regarded as suitable for powered operation. However, as trucks have tended to become larger in size and incorporate aerodynamic design features it has become more difficult to reach the operating mechanism and this problem is exacerbated for persons of small stature. Furthermore even for tall persons manual operation has caused soiling and tearing of clothing and, for some, may have contributed to back strains and the like.

SUMMARY OF THE PRESENT INVENTION

Accordingly, it is a principle subject of the present invention to provide a powered fifth wheel unlocking apparatus to permit remote activation of the jaw unlocking mechanism.

Another object of the present invention is to provide a powered unlocking device that is redundant to and may be operated to override the manually operable unlocking mechanism.

A further object of the present invention is to provide a fifth wheel accessory device that may be retrofitted on a fully manual fifth wheel to enable powered unlocking of the fifth wheel jaw mechanism redundant to the normal manual unlocking mechanism thereon.

The present invention utilizes a reciprocably carried cam means that is movable against a fifth wheel operating rod to move the rod from locked to unlocked position, and the cam means with a reciprocable power means are preferably mounted on a bracket that is fastenable on the underside of a fifth wheel generally opposing the operating rod.

BRIEF DESCRIPTION OF THE DRAWINGS

Further objects and advantages of the invention will become apparent from the following detailed description taken in conjunction with the drawings wherein:

FIG. 1 is a side view of a tractor and trailer with a fifth wheel mounting;

FIG. 2 is a bottom plan view of a fifth wheel incorporating the present invention with a cam retracted and a jaw in a first closed and locked position;

FIG. 3 is a detailed view of a portion of the apparatus shown in FIG. 2 comprising an accessory device with a reciprocable cam;

FIG. 4 is an end view of the device of FIG. 3;

FIG. 5 is a bottom plan view of a fifth wheel similar to FIG. 2 with the cam and operating rod extended and the jaw in a closed but unlocked position;

FIG. 6 is a bottom plan view of a fifth wheel similar to FIG. 5 with the cam retracted and the operating rod in the unlocked mode but the jaw remaining in a closed but unlocked position; and FIG. 7 is a schematic illustration of an energizing and control system for the present invention.

DETAILED DESCRIPTION

FIGS. 2, 5 and 6 illustrate a fifth wheel generally 24 in accordance with prior U.S. Pat. No. 4,871,182 modified in accordance with the present invention to include a powered accessory generally 200 having a reciprocable cam 202 engagable with an operating rod 102 of the fifth wheel. In so far as the parts of the fifth wheel are identified herein the nomenclature and reference characters of prior U.S. Pat. No. 4,871,182 will be used for ease of understanding. Also, for ease of understanding and illustration, the showing of the accessory generally 200 in FIGS. 2, 5 and 6 has been slightly simplified and details of certain angular relationships of its parts are more accurately shown in FIGS. 3 and 4.

As seen in FIG. 1 an over the road trailer 20 and tractor 22 are connected by a fifth wheel generally 24, which is pivotally mounted on brackets 26 secured to the tractor frame 28, and a king pin 30 secured to the underside of the forward bed plate of the trailer 20. As shown in FIGS. 2, 5 and 6, the upper surface of the fifth wheel contains an open "V" slot 42 to receive (and release) the trailer king pin 30 and the underside of the fifth wheel surface is reinforced with a skirt 44 and webs 46 and 48. A jaw generally 60 is pivotally mounted to the underside of the plate and positioned to swing across the apex of the "V" slot 42. The jaw 60 is bifurcated into detent portion 62 and a foot portion 64 with an opening therebetween. In FIG. 2, the jaw is shown in a closed and locked position capturing a reduced neck portion of king pin 30 and preventing extraction of the pin 30 from the fifth wheel 24. This closed and locked position is automatically assumed when a trailer is moved relatively forwardly onto the fifth wheel 24 so as to advance the king pin 30 through the slot 42 and against the inner portion of jaw foot 64.

A locking mechanism generally 70 is slidingly engagable with the jaw detent 62 when the jaw is in the closed position, as illustrated, and thereby locks the jaw 60 closed. Locking mechanism 70 includes a bolt 72 and head 76 that are held under the fifth wheel 24 by a cover guard (not shown) and intersected by a locking lever 90 that is pivotally secured at one end to the underside of the fifth wheel 24. A compression spring 94 biases the bolt 72 to move inwardly toward the jaw 60 Thus when a king pin 30 is moved into the jaw 60 spring 94 will drive the bolt 72 and head 76 inwardly to capture detent 62 and also move the locking lever 90 inwardly (counter clockwise as viewed in FIGS. 2, 5 and 6).

It is also shown that the free end of locking lever 90 terminates in a eyelet 96 that cooperatively receives a crank of an operating rod generally 102 that extends outwardly through a port in skirt 44 to a handle 108. When the compression spring 94 of the locking mechanism 70 drives the bolt 72 and locking lever 90 counter clock wise the operating rod 102 will be carried in the same direction. The inner end of the operating rod 102 terminates as a follower end 104 that cooperates with a guide means 140 on the fifth wheel undersurface. The guide means 140 is preferably in the form of a track or groove having a generally "Z" shaped configuration of three legs 142, 144 and 146 which translate, successively, to looked, intermediate and unlocked positions of the locking mechanism generally 70.

Normally, and as explained in patent 4,871,182, the locking mechanism 70 is moved from locked to unlocked condition through the aforesaid positions manually by a driver grasping the handle 108 and both pulling and twisting the rod 102 so that the follower 104 moves along the legs of guide means 140 and the crank of rod 102 correspondingly moves the locking lever 90 outwardly (clockwise).

According to the present invention a cam means and a power means are also provided to propel the follower 104 through the same sequence and guide means 140. In the embodiment illustrated, a reciprocable cam generally 202 is located to push and turn the follower 104 so as to trace the same path along legs 142, 144 and 146 of groove 140.

It will be seen in FIGS. 2, 3, 5 and 6 that the cam 202 has a generally "L" shaped boot with a sloping foot portion 204 and an ankle portion 206 upstanding therefrom. The heel of the cam foot is connected to a guide shaft 208 which is slidable along an enclosing guideway 210 that is secured to a mounting bracket generally 216. The bracket 216 is bent upon itself so as to form a hook 218 that holds a power means such as a fluid cylinder 230 with its reciprocable shaft 232 parallel to the guide shaft 208. A clevis 234 at the free end of reciprocable shaft 232 is pinned to the ankle portion 206 of the cam 202. A cam return means such as a tension spring 240 is connected between the cam 202 and the mounting bracket 216 so as to bias the cam 202 and the reciprocable shaft 232 toward a retracted position with the shaft 232 withdrawn into the power cylinder 230 when the latter is deactivated. When the power cylinder 230 is activated the shaft 232 is extended and moves the cam 202 outward (to the right as seen in the FIGURES).

Preferably, the power cylinder 230 is a pneumatic cylinder since virtually all over the road tractors have air compressors. However, it is also possible to employ equivalent power sources such as a hydraulic cylinder or electrical solenoid and the like.

As shown in FIG. 2, the aforedescribed powered accessory generally 200 of FIGS. 3 and 4 is mounted under the fifth wheel 24 by securing the mounting bracket 216, with bolts or the like, to a major transverse web 46 with the sloping foot portion 204 of cam 202 retracted and opposing the follower end 104 of the manual operating rod 102 when in the first locked position at leg 142 of guide means 140. It is to be understood that the radial webs 48 and the guide means groove generally 140 are relatively shallow, as compared to the transverse web 46 and the cam foot 204 guide shaft 200 and guide way 210 are trained along the under edge of the radial webs 48. Thus when the power cylinder 230 is energized to extend shaft 232, the cam 202 will move outwardly (to the right as viewed in the FIGURES) and the operating rod follower 104 will first ride upwardly on the sloping foot portion 204, thereby twisting the operating rod 102 and moving the follower end 104 through the first leg 142 into the second leg 144 of the guide means groove 140. When the cam 202 is advanced to the point that the follower end 104 reaches the crotch between the sloping foot 204 and the cam ankle portion 206 the follower will be in the second leg 144 and will be next moved to the right, thereby pivoting the locking lever 90 outwardly (clockwise) so as to gradually withdraw the locking head 76 from the jaw detent 62. Finally, when the power cylinder shaft 232 is fully extended, the follower end 104 will have reached the third leg 146 of guide means groove 140 and the locking head 76 will be fully disengaged from jaw 60 so as to allow the jaw to pivot and permit separation of the king pin 30 through the "V" slot 42 in the fifth wheel 24.

It is preferred to orient the plane of the cam foot 204 so as to be nearly perpendicular to the follower end 104 of operating rod 102 when in the locked position of leg 142 of guide means 140. This requires the foot 204 to be canted with respect to the transverse web 46 and to the mounting bracket 216, as may be seen in FIG. 4. Also, the power cylinder 230 must be placed across at least one of the radial webs 48. To accommodate these two physical constraints the planes of the cam foot 204 and ankle portion 206 of cam 202 are angled with respect to one another and the guide way 210 is fastened to the mounting bracket 216 at an acute angle as shown in FIGURE 4 (rather than at a right angle as simplified in FIGS. 2, 5 and 6). Also, the hook 218 of this mounting bracket 216 is twisted so as to hold the power cylinder 230 clear of the web 48 and aligned with the end of the cam ankle portion 206. Further, it is preferred to harden the edge of the cam foot 204 for smoother contact with the follower 104 and longer wear.

Where the power cylinder 230 is pneumatic it is preferred that it be single acting so as to extend the shaft 232 upon introduction of compressed air through a single fluid conduit 250 and fitting 252 into the rear end of cylinder 230. In that embodiment the shaft 232 and cam 202 will gradually extend and remain fully extended so long as the source of compressed air remains connected to the conduit 250 and cylinder 230; and the shaft 232 and cam 202 will be withdrawn by the tension spring 240 only when the conduit 250 is reconnected to permit exhaustion of the cylinder.

In a preferred control system embodiment, schematically illustrated in FIG. 7, the fluid conduit 250 is connected to a delivery port 254 on an inversion valve 260. A supply port 262 on the inversion valve 260 is connected through a conduit 264 and a spring loaded on-off control valve 266 to a pressurized air supply line 270 of a tractor air compressor 272. The spring loaded control valve 266 may conveniently be located in the tractor cab and is biased to a position closed to the passage of air from pressurized line 270. Thus valve 266 must be manually held open by handle 278 to open the connection to high pressure line 270 and introduce pressurized air into the conduit 264. When the valve 266 is released to close the connection to line 270 it will connect the conduit 264 to an exhaust port 276 on the valve body. A control port 280 on the inversion valve 260 is connected by another conduit 282 to a tractor parking brake control valve 286 which is, in turn, connected to the pressurized air supply line 270. The inversion valve 260 is a pilot operated two way valve having an internal spring loaded piston (not shown) that operates internally to control air flow between the delivery port 254 and the supply port 262 and to alternately connect the delivery port 254 either to the supply port 262 or to an exhaust opening 290 at one end of the valve body. The internal piston is driven to close the connection between supply port 262 and delivery port 254, and to connect the latter to the exhaust opening 290, when pressurized air is delivered through conduit 282 to the control port 280. (A suitable commercially available inversion valve for the system described is model TR-3 of the Bendix Heavy Vehicle Systems Group of Allied-Signal Inc.)

Pressurized air will be continuously delivered to the control port 280 in the illustrated system while the tractor parking brake is not applied (that is during all times that the tractor is capable of movement) because the usual brake system for tractors is a fail safe design that utilizes pressurized air to maintain the brakes disengaged. Thus in the illustrated system the inversion valve 260 will connect the fluid conduit 250 and power cylinder 230 to the exhaust opening 290 of the inversion valve 260 and will block the supply of pressurized air to the power cylinder 230 until the tractor parking brake control valve 286 is engaged. Upon that event pressurized air to conduit 282 and control port 280 is discontinued and the inversion valve 260 is moved to connect conduits 264 and 250 and pressurized air will then be supplied to the power cylinder 230 ony so long as the spring loaded valve 266 is manually held open by the tractor driver. Thus the reciprocable cam 202 may be extended to unlock the jaw 60 (FIG. 5) only when the tractor parking brake is engaged. And whenever the control valve 266 is released the tension spring 240 will return cam 202 to the withdrawn position (FIG. 6) and air from the power cylinder 230 will be expelled through conduits 250, 264 and the exhaust port 276 on control valve 266.

Other arrangements with double acting cylinders may also be made functional.

The foregoing details have been provided to describe a best mode of the invention and further variations and modifications may be made without departing from the spirit and scope of the invention which is defined in the following claims.

What is claimed is:

1. An improved fifth wheel apparatus for an over the road tractor wherein a locking lever is movable between locked and unlocked positions by a manual operating rod having a follower end that moves along a guide means under the fifth wheel, said improvement comprising:
   a cam means for propelling said follower end, said cam means being positioned under said fifth wheel and located to be movable against said follower end of said operating rod; and
   power means for moving said cam means and connected thereto whereby upon activation of said power means said cam means is moved from a retracted position to an extended position whereby to propel said follower end along said guide means from a locked position to an unlocked position.

2. The apparatus of claim 1 including a means for returning said cam means to a retracted position.

3. The apparatus of claim 1 wherein said cam means slides against said follower end and is unconnected thereto whereby said follower may also be manually moved between said locked and unlocked positions and the cam means and power means are a redundant system for propelling said follower end.

4. The apparatus of claim 1 wherein said cam means includes a cam member, a guide way and a guide shaft connected to said cam member and slidingly held in said guide way whereby said cam member is confined to reciprocable movement.

5. The apparatus of claim 1 wherein said power means includes a reciprocable shaft connected to said cam means.

6. The apparatus of claim 5 wherein said power means is a fluid cylinder with a reciprocable shaft.

7. The apparatus of claim 6 wherein a fluid conduit is connected between said fluid cylinder and a control valve located remote from said fifth wheel and said valve is connected between a source of pressurized fluid and an exhaust port.

8. The apparatus of claim 4 wherein said power means includes a reciprocable shaft connected to one of said cam member and said guide shaft.

9. The apparatus of claim 8 wherein said power means is a pneumatic cylinder.

10. The apparatus of claim 9 wherein a fluid conduit is connected between said pneumatic cylinder and a control valve located remote from said fifth wheel and said valve is connectable between a source of compressed air and an exhaust port.

11. The apparatus of claim 10 wherein said source of compressed air is a tractor compressor that is also connected to the tractor brake system, and including an inversion valve connected in said fluid conduit between said pneumatic cylinder and said control valve, said inversion valve having pilot means to control air flow through said conduit and said pilot means being operatively connected to said brake system.

12. The apparatus of claim 11 wherein said pilot means is connected by a conduit to a tractor parking brake control valve whereby to receive pressurized air when the parking brake is not applied and thereby block air flow through said fluid conduit when the parking brake is not applied.

13. An accessory apparatus for mounting on a fifth wheel for an over the road tractor, said accessory comprising: a mounting bracket securable to the underside of a fifth wheel substantially opposite an operating rod for the locking mechanism of said fifth wheel;
   a cam means for propelling said operating rod said cam means being mounted on said bracket;
   and power means for moving said cam means and connected thereto whereby upon activation of said power means said cam means is moved from a retracted position to an extended position whereby to propel said operating rod from a locked to an unlocked position.

14. The apparatus of claim 13 including a means for returning said cam means to a retracted position.

15. The apparatus of claim 13 wherein said mounting bracket is securable so as to orient said cam means to slide against said operating rod without being connected thereto whereby said operating rod may be manually moved between said locked and unlocked positions and the cam means and power means will form a redundant system for propelling said operating rod.

16. The apparatus of claim 13 wherein said cam means includes a cam member, a guide way and a guide shaft connected to said cam member and slidingly held in said guide way whereby said cam member is confined to reciprocable movement.

17. The apparatus of claim 13 wherein said power means includes a reciprocable shaft connected to said cam means.

18. The apparatus of claim 17 wherein said power means is a fluid cylinder with a reciprocable shaft.

19. The apparatus of claim 16 wherein said power means includes a reciprocable shaft connected to one of said cam member and said guide shaft.

20. The apparatus of claim 19 wherein said power means is a pneumatic cylinder.

* * * * *